US 6,735,902 B1

(12) United States Patent
Ahm

(10) Patent No.: US 6,735,902 B1
(45) Date of Patent: May 18, 2004

(54) TAPE WITH GERMINATING UNITS AND PACKING THEREOF, AS WELL AS A METHOD AND AN ASSEMBLY FOR THEIR PRODUCTION

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 09/720,366
(22) PCT Filed: Jun. 23, 1999
(86) PCT No.: PCT/DK99/00349
§ 371 (c)(1), (2), (4) Date: Dec. 22, 2000
(87) PCT Pub. No.: WO00/00007
PCT Pub. Date: Jan. 6, 2000

(30) Foreign Application Priority Data

Jun. 29, 1998 (DK) .................................. 1998 00838

(51) Int. Cl.⁷ .............................................. A01C 1/04
(52) U.S. Cl. ................................................ 47/56
(58) Field of Search .................................... 47/56, 9

(56) References Cited

U.S. PATENT DOCUMENTS 5,081,791 A   1/1992   Baron et al. ................... 47/66

FOREIGN PATENT DOCUMENTS

| EP | 0182263 | 5/1986 | ............ A01G/9/10 |
| EP | 0823203 | 2/1998 | ............ A01G/9/10 |
| GB | 2142213 | 1/1985 | ............ A01C/1/04 |

*Primary Examiner*—Son T. Nguyen
(74) *Attorney, Agent, or Firm*—Cooper & Dunham LLP; Donald S. Dowden

(57) ABSTRACT

A tape (1) with germinating units (9) comprising growth-suited parts of a plant, such as seeds, meristems or the like parts (10), which are able to develop into plants in the tape (1). The tape and the germinating units comprise at least one or two, respectively, biodegradable material layers (2, 4), such as paper, and are suited for a mechanical bedding out with the plants vertically arranged in a furrow in the ground. The tape (1) comprises furthermore a mixture (5) of a carrier (12) and additives permanently or loosely bound to said carrier in each germinating unit (9). The additives are suited for protecting the plant (10) against undesired effects and for controlling the moisture conditions about the plant and the development and growth of said plant in the tape (1). The parts of a plant (10) and the mixture (5) are attached to at least one of the material layers (2, 4), and the material layers (2, 4) are secured to one another in each germinating unit (9) about the parts of a plant (10) and the mixture (5) by means of a glue (6, 6') and/or by being pressed into one another.

13 Claims, 3 Drawing Sheets

TAPE WITH GERMINATING UNITS AND PACKING THEREOF, AS WELL AS A METHOD AND AN ASSEMBLY FOR THEIR PRODUCTION

TECHNICAL FIELD

The invention relates to a tape with germinating units succeedingly arranged in the longitudinal direction of said tape, where the germinating units comprise growth-suited plant parts, such as seeds, meristems or the like parts, which are able to develop into plants in the tape, or where the tape comprises plants developed from said plant parts, the tape being placed edgewise, and where the tape and the germinating units comprise at least one or two, respectively, joined strips of paper being intended for mechanical bedding out in a furrow in the ground.

BACKGROUND ART

The above is known from the Applicant's own application, cf. DK-171,407-B1.

EP 0 056 687-A3 discloses a seed tape comprising a strip of biodegradable material vertically bedded out in the soil, and whereby seeds are attached to the upper portion of said strip and concentrated fertilizers and optionally other chemicals are attached to the lower portion of said strip. As stated, this publication deals with a seed tape, and apparently no measures have been taken for making this tape with the germinated plants suited for a mechanical bedding out.

EP 0 097 735 A1 discloses a method of attracting and bedding out plants or radicles, where a cigar-shaped sleeve of paper, plastic sheet or the like biodegradable material is used for each plant. The cigar-shaped sleeve is filled with earth, peat or another growth substrate, in which a seed is placed. The sleeves are attached to a tape or a wire, and together with said tape or wire the sleeves are rolled or folded up into a package. The plants are developed in a greenhouse in the package before they are bedded out in the sleeve one by one or together with the tape.

BRIEF DESCRIPTION OF THE INVENTION

The object of the invention is to provide a tape with germinating units, where the tape is inexpensive to produce, biodegradable and environmentally acceptable, where the plants can develop in the tape under the most favorable conditions while said tape is placed edgewise, where the tape with the germinated plants is suited for a mechanical bedding out with a permanent distance between the plants and at a correct height, and where the tape or the germinating units comprise the substances necessary for ensuring an optimum germination and continued favorable growth and protection of the plants.

Another object of the invention is to provide a tape prepared for a mechanical bedding out of the individual germinating units with plants.

A particular object of the invention is to provide a tape ensuring an optimum ratio of air (oxygen) to moisture about the plant parts and the roots of the plant both before, during and after the germination of said plants.

Yet another object of the invention is to provide a tape, where both the nature, the amount and the placing and release of the added substances ensure the most favorable effect on the development of the plants and the highest possible environmental protection consideration.

An additional object of the invention is to provide a package of the tape, which particularly ensures uniform and favorable germination and growth conditions, and which furthermore ensures an unproblematic and rational handling and mechanical bedding out of the tape.

The tape according to the invention is characterised in the features stated in the characterising clause of claim 1. As a result, each plant part or plant is contained in a germinating unit and attached to the tape together with the mixture or the mixtures in such a manner that said tape can stand up to a mechanical handling without said plants or plant parts being displaced in or falling out of said tape. The carrier ensures the attachment of the additives, and several mixtures render it possible to selectively place said additives relative to the plant part. In addition it is possible to control the release of the additives with the result that optimum germination and growth conditions can be ensured for the plants.

As the additives are placed locally about the germinating unit, it is possible to ensure that substances having a detrimental effect on the plant part when applying in high concentrations are placed at a distance from said germinating unit and thus only reach the plant part in a less concentrated form.

The carrier may according to the invention advantageously comprise one or more of the substances: vermiculite, perlite, zeolite, cellulose materials, such as wood fibres, sphagnum, burned clay, mineral fibres, such as rock wool or the like substances, whereby it is possible to obtain a desired degree of water retaining capacity, water conveying capacity, ion exchanging properties etc.

The additives may in principle comprise all substances compatible with the remaining selected materials and agents having a favorable effect on the storage, germination, and growth of the parts of the plant in question. The additives according to the invention may for instance comprise one or more of the substances: pesticides, including herbicides, insecticides, especially systemic insecticides, fungicides, virae, cultures of bacteria, cultures of fungi, such as Trichoderma, fungus spores, microencapsulated fungicides, eggs from useful insects, such as predatory nematodes, fertilizers, hormones, enzymes, animal repellants, pH-adjusting agents, carbon, clay particles, trace elements, such as molybdenum, wood fibres or wood powder, kieselguhr, surfactants, water-absorbing agents, such as superabsorbing polymer (SAP) or carboxymethyl cellulose (CMC), silica and other additives with favorable effects on the germination and the growth of plants, where several substances are available in microencapsulated form with the result that they are protected against biodegradation and a controlled release thereof can be carried out.

According to the invention the binder may advantageously comprise polyvinyl alcohol or polyethylene glycol or another plant-compatible binder, such as water or water containing polysaccharide or mixtures thereof.

The plants or plant parts are advantageously placed at a specific distance from one rim, viz, the upper rim, of the tape, which corresponds to the ideal bedding out depth in the soil for the plant in question. The latter is of particular importance when the plants are to be bedded out in form of a coherent tape.

If the paper used is glazed and provided with a glue film on the side facing inwards in the tape, it is ensured that the two paper strips of the tape adhere to one another and that both the plant parts and the mixtures adhere to said strips. In addition it is ensured that air can easily circulate into and out of the interior of the germinating units and that the roots of the plants can cling to the burrs.

The paper used is advantageously of a weight not exceeding 80 g/m², preferably not exceeding 50 g/m², especially maximum 20 g/m², whereby the material costs of the tape are as low as possible at the same time as a suitable strength of said tape is maintained. The paper can for instance be kraft paper.

One strip of material of the tape is made of crepe paper with the result that both a reduced frictional resistance and consequently also a reduced pull in the tape are obtained in connection with the mechanical bedding out of said tape.

The paper used is advantageously translucent in the moist state with the effect that light can penetrate to the seed during the germination process, said seed, such as a celery and tobacco seed, requiring a small amount of light during the germination process.

According to a particular embodiment of the tape, the germinating units may be closely juxtaposed, and cuts or weakening lines may be provided in the transitions between adjacent germinating units, said cuts or weakening lines allowing an easy separation of said germinating units, for instance by way of simply tearing off the outermost germinating unit in order to separately bed out said germinating unit.

According to the invention the growth-suited plant parts may be seeds or meristems.

According to the invention the tape may be adapted to be packed in a package, the tape being zigzag folded and placed in a bag or a box. Such a shape of the tape turned out to be very favorable both for ensuring a uniform space for the plants during the germination and the growth in the package and for ensuring a rational handling of the tape both in storage and transit as well as especially at the bedding out.

The invention also relates to a method of producing the tape according to the invention, and this method is characterised in the features stated in the characterising clause. This method turned out to be particularly advantageous for ensuring a reliable packing of the plant parts and the mixture in a closed germinating unit in such a manner that they are not displaced in or fall out of said germinating unit.

A particularly simple and reliable embodiment of the method according to the invention is characterised in that the pressing process is established by means of two co-acting profiled wheels or rolls, which optionally at the same time establish interrupted cuts or weakening lines in the lengths of material between the plant parts in the rows.

A further particularly simple embodiment of the method according to the invention is characterised in that the lengths of material secured to one another are longitudinally cut between the rows of plant parts and optionally transversely between said plant parts, whereby germinating tapes or separate germinating units are provided.

According to yet another particularly preferred embodiment of the method according to the invention the tape resulting from the longitudinally cutting is folded up in a zigzag way into a package and subsequently placed in a germinating box with the rim side of said tape resting on a base, whereby an advantageous germination of the seeds into plants is carried out in said box, said plants being ready for a bedding out in vertical position together with the tape.

The invention relates furthermore to an assembly for carrying out the method according to the invention, and this assembly is characterised in the features stated in the characterising clause. This assembly turned out to be particularly efficient for carrying out the method according to the invention. In addition, the assembly does not take up much room, and the produced packages take up minimum room both in storage, in transit and during the germination. Moreover a significant advantage is found in the fact that the germinating boxes used for the germination can be used in transit as well as for the mechanical bedding out of the tapes by means of a bedding machine.

BRIEF DESCRIPTION OF THE DRAWINGS

The invention is explained in detail below with reference to the accompanying drawing, in which.

BEST MODE FOR CARRYING OUT THE INVENTION

Figure 1:
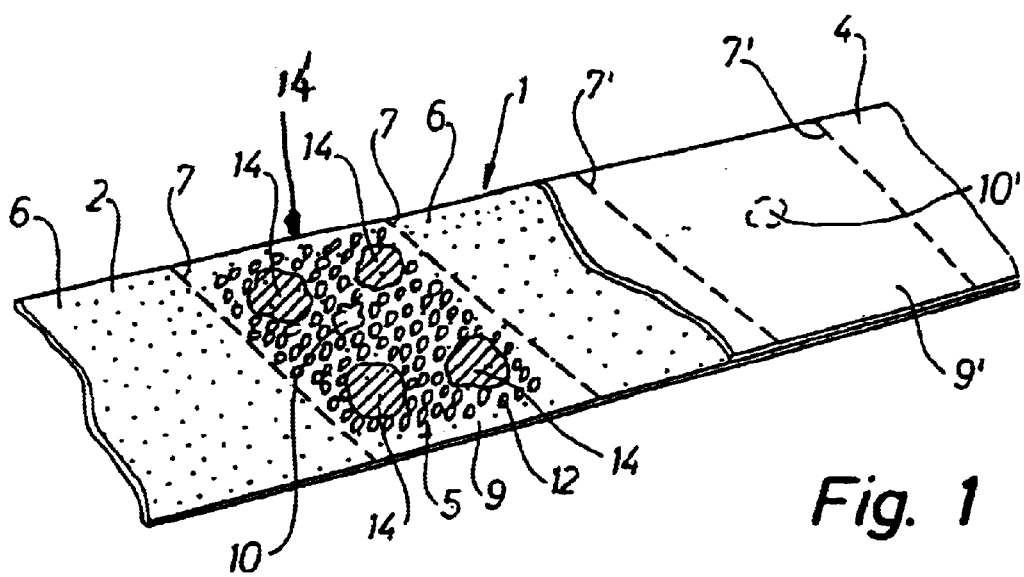
FIG. 1 is a perspective view of a segment of a tape according to the invention, where one material layer has been partially removed, said view showing germinating units containing seeds, carrier and additives prior to the germination.

FIG. 1 is a sectional view of a tape 1 according to the invention, which comprises two material layers 2, 4, one layer 4 thereof being partially removed for the sake of clarity. The bottom material layer 2 is provided with a glue coating 6 indicated by way of dots, and a corresponding glue coating 6' is provided on the side of the material layer 4 facing said side of the bottom material layer 2, cf. also FIG. 2. The broken lines 7, 7 and 7', 7' indicate the delimitations to two germinating units 9, 9'. A plant part in the form of a seed 10, 10', a mixture 5 of carriers 12 for the binder and additives (not shown), as well as locally dispensed additives 14 are put down in the germinating units 9, 9'. The seeds 10, 10' and the mixture 5 of the carriers 12 and the additives 14 are retained by the glue coatings 6, 6', and the material layers 2, 4 are also secured to one another by means of the glue coatings 6, 6' about the seeds 10, 10' and the mixture 5.

Figure 2:
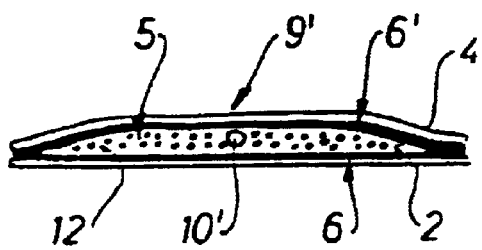
FIG. 2 is a sectional view through a germinating unit.

FIG. 2 is a sectional view through a germinating unit 9' of FIG. 1. The two material layers 2, 4 appear with the glue coatings 6, 6' as well as a seed 10' and the mixture 5 with the carriers 12. The material layers 2, 4 are secured to one another about the seeds and the mixture by means of the glue coatings 6, 6'.

Figure 3:
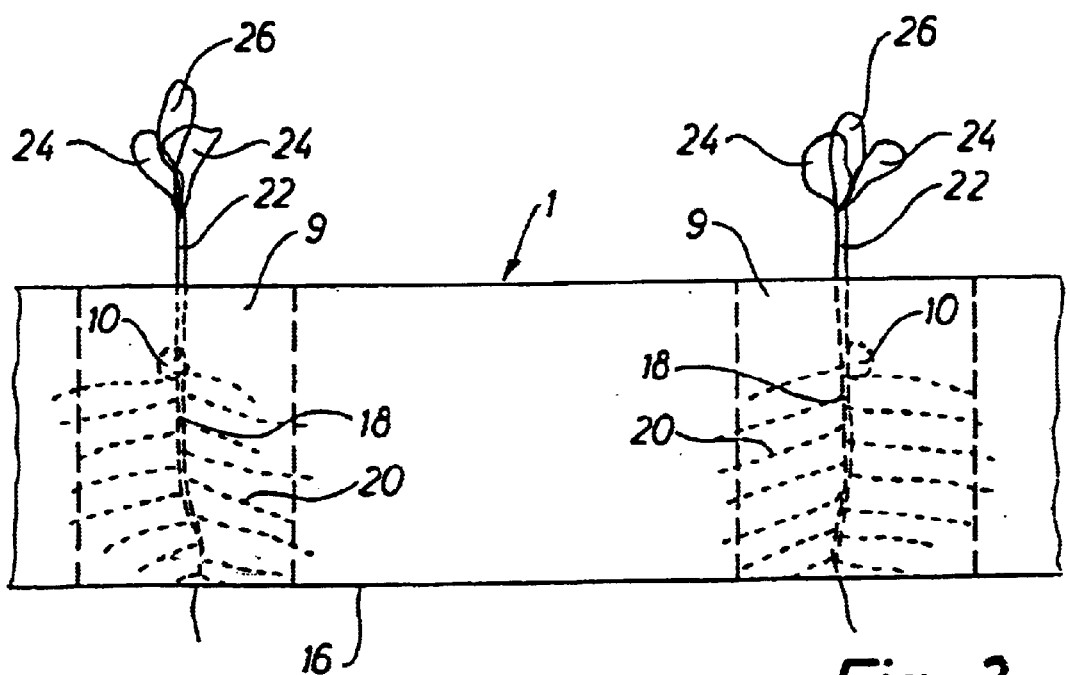
FIG. 3 is a sectional side view through a tape with germinated plants.

FIG. 3 is a sectional side view of a tape 1 of FIG. 1. This tape 1 has been subjected to a germinating process with said tape standing on the rim 16 in such a manner that the seeds 10 have developed into plants with a radicle 18, adventitious roots 20, a stem 22, seed leaves 24 and a defining leaf 26. The illustrated tape 1 is ready for a mechanical bedding out in a furrow in the ground at a desired height and with the shown bedding out distance as the desired permanent distance between the plants.

Figure 4:
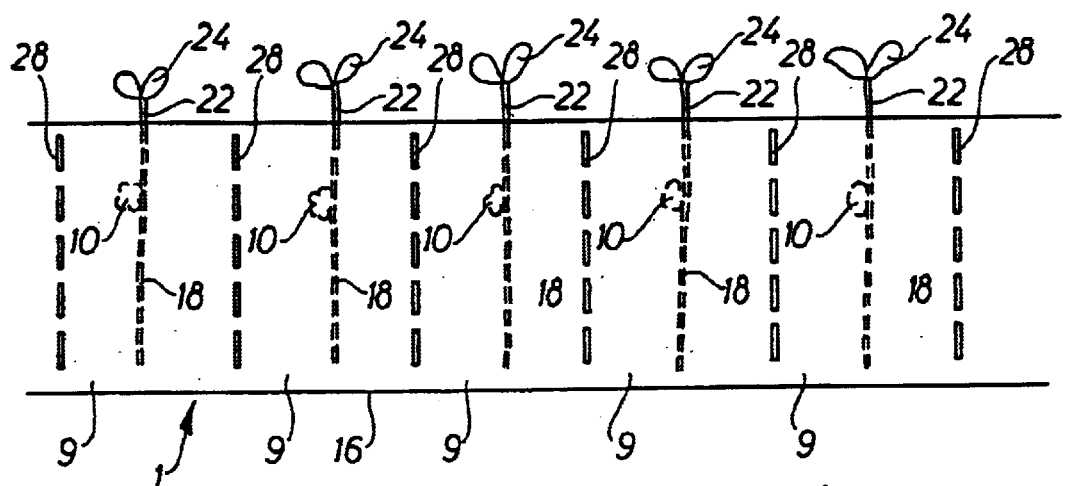
FIG. 4 is a sectional side view through a tape with closely juxtaposed germinating units with transitions with interrupted cuts.

FIG. 4 is a sectional view of a tape 1 with closely juxtaposed germinating units 9, where the transitions between the germinating units are provided with interrupted cuts 28. The cuts 28 render it easy to separate the tape 1 into its individual germinating units 9 in order to bed out said units 9 separately. Again the tape 1 has been subjected to a germinating process while standing on the rim 16 in such a manner that the seeds 10 have developed into seedlings with a radicle 18, stem 22 and seed leaves 24.

Figure 5:
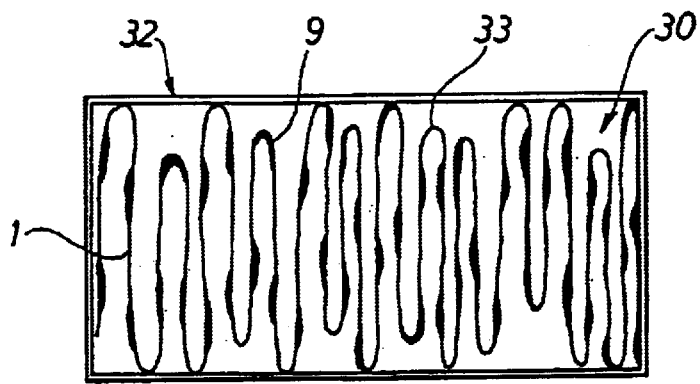
FIG. 5 is a top view of a package of a zigzagged non-germinated tape according to the invention.

FIG. 5 is a top view of a package 30 of a zigzagged non-germinated tape 1 with germinating units 9 like the tape 1 of FIG. 1. The package 30 is placed in a germinating box 32 and shown with a significantly reduced filling or density compared to ordinarily used packages for the sake of clarity.

As a general rule the zigzags 33 of the package should not extend beyond one another, but be almost uniformly distributed across the width of the package. Correspondingly, the germinating units 9 should be uniformly distributed across the width of the package so as to provide equal space for each germinating unit 9 and consequently for each plant.

Figure 6:
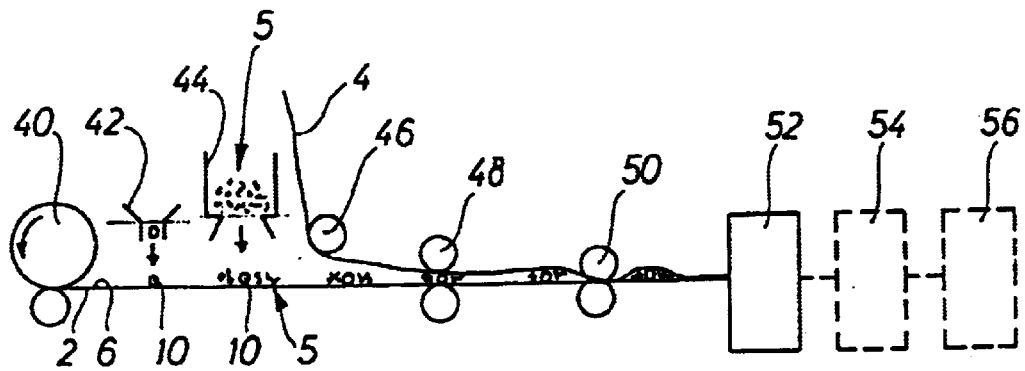
FIG. 6 is a flow sheet of an assembly according to the invention for the production of the tape.

FIG. 6 is a flow sheet of an assembly according to the invention for the production of the tape 1. The assembly comprises a station 40 allowing a length of material 2 to be pulled off therefrom. This length of material is provided with a glue coating 6 of the type permanently gluing adhesive. The assembly comprises furthermore a seed dispensing station 42 for putting down seeds 10 onto the length of material 2. The seeds 10 are placed at regular intervals in rows in the longitudinal direction of the length of material.

Moreover, a mixture dispensing station 44 is provided, which dispenses the mixture 5 of carrier 12, binder and additives in portions onto the length of material 2 at or about each seed 10. The second length of material 4 is carried about a guide roller 46 and downwards and towards the first length of material 2 at a joining station 48, where said lengths of material are joined. Moreover a pressing station 50 is provided for joining the two lengths of material 2, 4 in portions between the seeds 10 and the mixture 5. This station can also establish interrupted cuts 28 or weakening lines between the seeds 10 in the rows by way of stamping, said lengths of material being locally pressed together and/or into one another about the individual seeds 10 with the associated dispensed mixture 5. Furthermore, the assembly can be provided with a cutting station 52 with a first set of cutting means for longitudinally cutting the joined lengths of material between the rows of seeds, and a second set of cutting means for optionally transversely cutting the joined lengths of material between the seeds. The latter has also been diagrammatically illustrated. Furthermore, the assembly can comprise a packing station 54 adapted to pack the ready-made germinating units or germinating tapes in such a manner that the package used is preferably shrunk about said germinating units or germinating tapes. Finally, the assembly can comprise a germinating station 56, in which the tape 1 is placed in the packed state 30, cf. FIG. 5, in a germinating box 32 and then subjected to the germinating process suitable for the type of plant in question.

Figure 7:
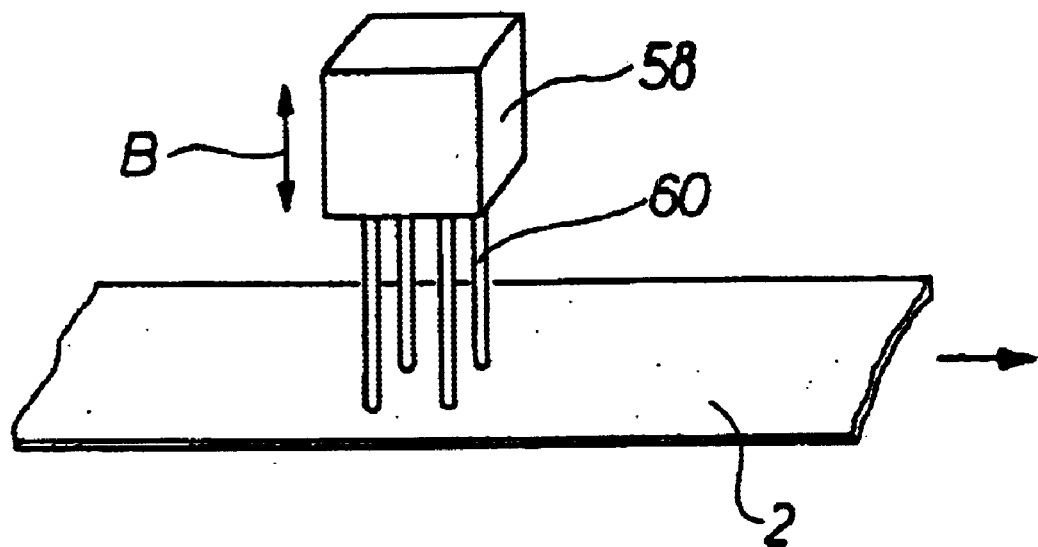
FIG. 7 is a perspective view of a device for locally dispensing additives to a germinating unit.

An additional station 58 can be coupled between the station 44 and the putting down of the second length of material 4, FIG. 7 showing an enlarged view of said additional station. This additional station 58 is used when the previously mentioned additives 14 must be placed locally in portions 14' of the germinating unit, and especially when said additives 14 are to be applied by way of spraying in liquid state or by way of putting them down in form of granulated or powdered substances, cf. the portions 14' in FIG. 1. A tube 60 is provided on the bottom side of the additional station 58 for each of the desired portions 14'.

The invention may be modified in many ways without thereby deviating from the scope of the invention as defined in the appended claims. Although the drawing only shows germinating units containing one seed or one plant, respectively, nothing prevents each germinating unit from containing more than one seed or one plant, respectively.

The term "biodegradable material" is in the present text to be construed as a material being biodegraded during the growing period of the culture in question.

What is claimed is:

1. A tape formed of material layers meeting at top and bottom rims and having germinating units (9) succeedingly arranged in the longitudinal direction of said tape, where the germinating units comprise growth-suited plant parts able to develop into plants in the tape, or plants developed from said plant parts, the tape being placed standing on its bottom rim and the plants emerging through its top rim, and where the tape and the germinating units comprise at least one strip of biodegradable paper material, said tape being intended for mechanical bedding out in a vertical position in a furrow in the ground, wherein the germinating units at or about each plant part are provided with a mixture (5) of at least one carrier (12) and additive permanently bound to said carrier by a glue, said mixture being put down at or about each plant part by a mixture dispensing station, said additives comprising a superabsorbing polymer and protecting the plant parts against undesired effects, and controlling the moisture conditions about the plant parts and the development of the plant parts in the tape (1), said mixture (5) and said plant parts (10) being attached to at least one of the strips (2, 4), at the mixture dispensing station (44), the strips (2, 4) of each germinating unit (9) being kept together about the plant parts (10) by a glue film (6, 6');

wherein the paper material is glazed on the side facing the plant parts or plants and is provided with said glue film (6, 6');

wherein the germinating units (9) are closely juxtaposed, and cuts (28) are established in the transitions between adjacent germinating units, said cuts (28) allowing an easy separation of said germinating units (9).

2. A tape as claimed in claim 1, wherein the carrier (12) is selected from the group consisting of vermiculite, perlite, zeolite, cellulose materials, wood fibres, sphagnum, burned clay and rock wool.

3. A tape as claimed in claim 1, comprising additional additives selected from the group consisting of pesticides, herbicides, insecticides, fungicides, virae, cultures of bacteria, cultures of fungi, fungus spores, microencapsulated fungicides, eggs from useful insects, fertilizers, hormones, enzymes, animal repellants, pH-adjusting agents, carbon, clay particles, trace elements, wood fibres, wood powder, kieselguhr, surfactants, water-absorbing substances, carboxymethyl cellulose (CMC), silica, and other additives with favourable effects on the germination and the growth of plants.

4. A tape as claimed in claim 1, wherein at least of the additives is placed in local portions (14) of the germinating unit (9).

5. A tape as claimed in claim 1, wherein the binder is selected from the group consisting of polyvinyl alcohol, another plant-compatible binder, water, water containing polysaccharide, and mixtures thereof.

6. A tape as claimed in claim 1, wherein the plants or the parts (10) of a plant are placed at a specific distance from one rim of the tape, which corresponds to the ideal placing depth in the soil of the plants in question.

7. A tape as claimed in claim 1, wherein the tape comprises a paper of a weight not exceeding 80 g/m².

8. A tape as claimed in claim 1, where said tape (1) comprises two strips of material (2, 4) and one strip of material is made of crepe paper.

9. A tape as claimed in claim 1, wherein the tape comprises a paper that is translucent in the moist state.

10. A tape as claimed in claim 1, wherein the growth-suited plant parts are selected from the group consisting of seeds and meristems.

11. A tape as claimed in claim 1, said tape being zigzag folded and placed in a package.

12. A method of producing and deploying a tape having top and bottom rims and having germinating units, the method comprising the steps of putting down growth-suited plant parts or plants in rows on a glue film (6) on a first length of biodegradable paper material (2) in the longitudinal direction of said length of material in such a manner that said plant parts or plants are fixed at regular intervals in the rows, binding together a mixture (5) of at least one carrier (12) and additives, wherein the additives comprise a super-absorbing polymer (SAP), putting down the mixture at or about each plant part or plant, subsequently placing a second length of biodegradable paper material (4) on top of the first length of material (2), subjecting the two lengths of material (2, 4) to a pressing and gluing process at the portions surrounding the plant parts or plants (10) and the mixture (5) so as to locally fix the lengths of material to one another about the individual plant parts or plants and the mixture and orienting the tape standing on its bottom rim to facilitate growth of the growth-suited plant parts or plants through its top rim, wherein the first and second paper materials are glazed on thier side facing the plant parts or plant and are provided with said gluing, wherein the germinating units are closely juxtaposed, and cuts are established in the transitions between adjacent germinating units, said cuts allowing an easy separation of said germination units, wherein the pressing is established by two co-acting profiled wheels or rolls, which simultaneously establish interrupted cuts in the lengths of material (2, 4);

wherein the tape is folded up in a zigzag way into a package (30) and subsequently placed in a germinating box (32) with the rim side (16) of said tape resting on a base, whereafter growth is carried out in said box, said plant parts or plants being ready for a mechanical bedding out in vertical position together with the tape (1).

13. A method as claimed in claim 12, wherein the joined lengths of material (2, 4) are longitudinally cut between the rows of plant parts and transversely between said plant parts or plants.

* * * * *